United States Patent
Chen (10) Patent No.: US 9,996,331 B1
(45) Date of Patent: Jun. 12, 2018

(54) CUSTOMIZED APPLICATION STATE TRANSITION

(71) Applicant: VMware, Inc., Palo Alto, CA (US)

(72) Inventor: Ping Chen, Shanghai (CN)

(73) Assignee: VMWARE, INC., Palo Alto, CA (US)

(*) Notice: Subject to any disclaimer, the term of this patent is extended or adjusted under 35 U.S.C. 154(b) by 0 days. days.

(21) Appl. No.: 15/367,198

(22) Filed: Dec. 2, 2016

(51) Int. Cl.
G06F 9/445 (2018.01)
H04L 29/08 (2006.01)

(52) U.S. Cl.
CPC .............. G06F 8/60 (2013.01); H04L 67/10 (2013.01); H04L 67/2809 (2013.01)

(58) Field of Classification Search
CPC ....................................................... G06F 9/445
USPC ................................................. 717/174–178
See application file for complete search history.

(56) References Cited

U.S. PATENT DOCUMENTS

| 8,225,308 | B2* | 7/2012 | Sedukhin | G06F 8/70 709/220 |
| 2011/0219311 | A1* | 9/2011 | Diament | G06F 15/173 715/736 |
| 2013/0232463 | A1* | 9/2013 | Nagaraja | G06F 8/61 717/101 |
| 2013/0232480 | A1 | 9/2013 | Winterfeldt et al. | |
| 2013/0232497 | A1 | 9/2013 | Jalagam et al. | |
| 2013/0232498 | A1 | 9/2013 | Mangtani et al. | |

* cited by examiner

*Primary Examiner* — Jae Jeon
(74) *Attorney, Agent, or Firm* — Su IP Consulting (57) ABSTRACT

An example method for managing application deployment in a cloud environment may maintain a state machine. The state machine may include a plurality of application states, a plurality of state operations, and relationships among the plurality of application states and the plurality of state operations. In response to a client request for performing a deployment operation on an application in the cloud environment, the method may retrieve a current state of the application in the cloud environment. In response to a determination that the deployment operation is allowed based on the state machine and the current state, the method may generate a deployment plan based on a blueprint associated with the application. The blueprint defines how to perform the deployment operation in the cloud environment.

16 Claims, 3 Drawing Sheets

CUSTOMIZED APPLICATION STATE TRANSITION

BACKGROUND

A cloud automation product may be used to perform cloud management operations on a cloud system. A generic application blueprint system in the cloud automation product may provide an application developer access to the hardware resources required to run an application, and enable the application developer to build, deploy, and manage the lifecycle of the application in the cloud system. However, during the deployments of the application, the generic application blueprint system can only provide a single approach for all types of applications, and may predetermine which operations are allowed to be executed at which points. For example, the generic application blueprint system may treat all day-2 operations as update, and may not allow the application developer to accurately control when to execute which operations, nor allow the application developer to define different life cycles for different types of applications.

SUMMARY

System and methods for managing application deployment in a cloud environment are provided. The method may maintain a state machine. The state machine may include a plurality of application states, a plurality of state operations, and relationships among the plurality of application states and the plurality of state operations. In response to a client request for performing a deployment operation on an application in the cloud environment, the method may retrieve a current state of the application in the cloud environment. In response to a determination that the deployment operation is allowed based on the state machine and the current state, the method may generate a deployment plan based on a blueprint associated with the application. The blueprint defines how to perform the deployment operation in the cloud environment.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

Figure 1:
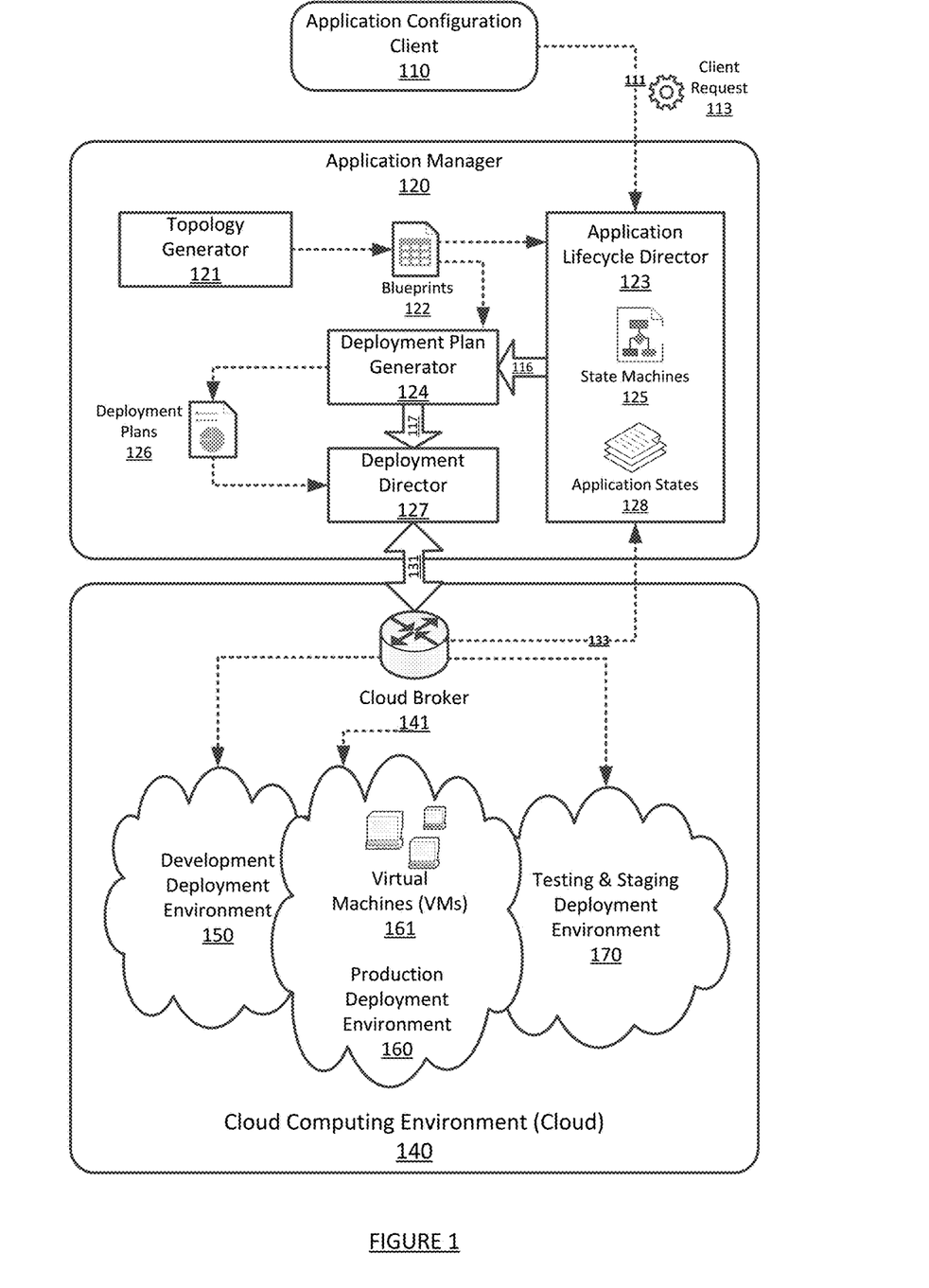
FIG. 1 illustrates a block diagram of a system capable of managing application deployment in a cloud environment, according to one or more embodiments of the present disclosure.

FIG. 1 illustrates a block diagram of a system capable of managing application deployment in a cloud environment, according to one or more embodiments of the present disclosure. In FIG. 1, the system may include an application manager 120 and a cloud computing environment 140 (or "cloud 140"). The application manager 120 may be configured to manage the cloud computing environment 140, as well as the one or more deployment environments 150, 160, and 170 contained therein. The application manager 120, which may be accessed by one or more cloud configuration clients 110, may include, among other hardware/software modules and components, a topology generator 121, an application lifecycle director 123, a deployment plan generator 124, and a deployment director 127. Specifically, the application manager 120 may be configured to manage application deployment in the cloud computing environment 140.

In some embodiments, a "cloud computing environment", or a "cloud", may be a network-based, computing architecture that provides shared pools of cloud resources on demand; and a "virtual machine cloud computing environment", or "VM cloud", may be a cloud computing environment implemented using some virtualized computing resources. The cloud 140 may contain, among other components, one or more virtual machines (e.g, VMs 161) and physical machines. The application manager 120 may be responsible for managing the cloud 140, and implementing various cloud functionalities such as resource pooling, resource allocating, high-availability, and automation etc. In some embodiments, the cloud 140 may be constructed using products such as the VMware vCloud®. The application manager 120 may be implemented using the VMware vRealize®.

In some embodiments, the cloud configuration client 110 may be installed on a client computer (e.g., a personal computer or workstation) to communicate with the application manager 120 for accessing and managing the cloud 140, as well as the VMs contained therein. The cloud configuration client 110 may interact with the application manager 120 via Transmission Control Protocol/Internet Protocol (TCP/IP), Hypertext Transfer Protocol (HTTP), or any other network communication means. Alternatively, the cloud configuration client 110 may be implemented as a software/hardware module executing directly on the application manager 120. In some embodiments, the cloud configuration client 110 may be implemented using a VMware vSphere® client.

In some embodiments, the application manager 120 may construct a cloud 140 by creating one or more VMs 161, in order to implement in the cloud 140 some cloud-based functionality, such as VM high-availability, VM load-balancing, VM resource distributions, etc. The VMs 161 may be created based on one or more physical machines having a "physical hardware platform" (e.g., an x86 architecture platform). The physical hardware platform may include various "physical hardware components" such as, without limitation, one or more physical Central Processing Units (CPUs), physical memory, physical storage (e.g., hard drive), physical Network Interface Card (NIC), and/or additional electronic circuit components (all of which are not shown in FIG. 1).

In some embodiments, the physical machines may include a "hypervisor" to construct a "virtual hardware platform" for the VMs 161 based on the physical hardware platform. The virtual hardware platform of the VMs 161 may be configured with one or more "virtual hardware components" such as, without limitation, one or more virtual CPUs, virtual memory, virtual storage, virtual NIC, and/or additional virtual components. The virtual hardware components may emulate the behaviors and the computing capabilities of the physical hardware components, thereby allowing the VMs 161 to function as if they were physical machines. Further, the application manager 120 may pool all the resources in the VMs 161 together to form "virtual computing resources" in the cloud 140.

In some embodiments, the cloud 140 may be used to implement one or more deployment environments 150, 160, and 170 for deploying an application. A "deployment environment" may refer to a relatively independent/isolated environment having a set of physical machines, VMs, and configurations, and allowing the application to be developed, tested, or executed without being interfered by other environments. As depicted in FIG. 1, the application manager 120 may configure in the cloud 140 multiple deployment environments (e.g., a development deployment environment 150, a testing and staging deployment environment 170, and a production deployment environment 160) for a specific application. The application manager 120 may create and manage the various deployment environments in the cloud 140 via REST (Representational State Transfer) APIs (Application Programming Interface) or any other client-server communication protocols. For example, the application manager 120 may utilize a VMware vCloud Director® REST API to manage a deployment environment implemented in a VMware vCloud datacenter.

In some embodiments, the application manager 120 may utilize a cloud broker 141 to access and manage the cloud 140 and the deployment environments 150, 160, and 170 contained therein. A "cloud broker" may be an application or module tailored to a specific cloud, and configured to perform various tasks in view of the specific cloud's customized implementation and configurations. For example, the cloud broker 141 may be configured to manage application deployment in the cloud 140. In other words, the cloud broker 141 may provide a communication interface by which application manager 120 may manage the deployment environments 150, 160, and 170 in the cloud 140.

In some embodiments, the cloud broker 141 may be implemented as a component or service of the cloud 140. In other words, the cloud broker 141 may be operating within the cloud 140's environment. Alternatively, the cloud broker 141 may be implemented as an application or service external to the cloud 140. In this case, the cloud broker 141 may be located at a third-party system, acting as a cloud service customer of the cloud 140, and may interact with the cloud 140 using network communications. In addition, the cloud broker 141 may also be installed as an internal component of the application manager 120.

In some embodiments, the application manager 120 may receive (111) one or more client requests 113, requesting the performing of certain deployment operations on a specific application in the cloud 140. The deployment of the application in the cloud may include the installations of logical deployment units (e.g., application packages and their dependent middleware and operating systems), as well as other supporting software, servers, and services. In some embodiments, the application manager 120 may implement a blueprint deployment approach to fulfill the client requests.

In some embodiments, the application manager 120 may utilize the topology generator 121 to generate a blueprint 122 for the application to be deployed to the cloud 140. A "blueprint" for the application may include a logical topology of virtual computing resources and application components associated with the deployment of the application. In addition, a blueprint 122 may be an abstract representation of the deployment environment for the application, including virtual machines, application components corresponding to the application, operating systems, services, dependencies, and configurations. A blueprint 122 may be used in the repeated deployments of the application in multiple and possibly diverse deployment environments.

In some embodiments, the topology generator 121 may identify a set of application components based on the application to be deployed, and construct the blueprint 122 using these application components. "Application components" may include application-specific binaries, scripts, or processes packaged in file-formats, all of which may be executed to perform the functionalities of the application. Examples of the types of application components include Java Archive (JAR) files, Java Enterprise Archive (EAR) files, Java web application archive (WAR) files, Ruby Gems packages, SQL scripts, and other suitable modules of scripting logic.

In some embodiments, the topology generator 121 may utilize the blueprint 122 to capture the hardware infrastructure that can support the execution of the application. Examples of the hardware infrastructure include VMs, application servers, database servers, monitoring services, web servers, messaging services, and other middleware services, as well as virtual computing resources that can be provisioned from the cloud 140. For example, the topology generator 121 may define the hardware infrastructure in the blueprint 122 as one or more nodes, each of which may represent a VM or a cluster of VMs 161 in the cloud 140. Afterward, the topology generator 121 may assign the application components to these nodes, indicating that these application components may be installed and executed on these nodes during the deployment process.

In some embodiments, the topology generator 121 may define one or more dependencies among the application components in the blueprint 122, to indicate an installation order of the application components during deployment. For example, since a load balancer usually cannot be configured until a web application is up and running, the topology generator 121 may specify a dependency from the load balancer to the web application.

In some embodiments, in response to a client request from the application configuration client 110, the application manager 120 may initiate a deployment process to deploy the application to a specific deployment environment (e.g., the deployment environment 160). Specifically, the application manager 120 may invoke the deployment plan generator 124 to construct a deployment plan 126 based on the blueprint 122. Alternatively, the deployment plan generator 124 may generate multiple deployment plans 126 from a single blueprint 122, in order to test prototypes (e.g., new application versions), to scale-up and scale down deployments, or deploy application to different deployment environments 150, 160, and 170. While the blueprints 122 may provide a component-oriented view of the application topology, the deployment plans 126 may provide a step-oriented view of the application topology defined in the blueprint 122 that depicts time dependencies between tasks to deploy the application components in a particular order.

In some embodiments, the deployment plan 126 generated by the deployment plan generator 124 may include a set of deployment settings derived from the blueprint 122 (e.g., virtual computing resources' cluster size, CPU, memory, networks), as well as an execution plan of tasks having a specified order in which virtual computing resources are provisioned, and application components are installed, configured, and started. Specifically, a "task" may be a specific operation (such as creation, installation, configuration) that can be implemented based on an executable program or script. For example, a task associated with an application component may be implemented using a computing script comprised of one or more lines of scripting logic that, when executed by a virtual machine on which the application component is hosted, perform operations for an application lifecycle stage (e.g., install, configure, start, stop, upgrade, migrate, etc.). A task may also include requesting installation via a package manager, setting environmental variables, launching runtimes, checking configurations, and other commands.

In some embodiments, the deployment plan generator 124 may select a deployment environment from a listing of available deployment environments in the cloud 140 to deploy the application. The deployment plan generator 124 may also select networks available in the cloud 140 for each logical network defined in the blueprint 122. Further, the deployment plan generator 124 may customize the blueprint 122 by specifying deployment-specific configurations of the nodes and application components. For example, the deployment plan generator 124 may provide for a node or application component a new property value that overrides or replaces a default value specified in the blueprint 122. The deployment plan generator 124 may also override node properties, such as memory allocation or number of CPUs defined in the blueprint 122.

In some embodiments, the deployment plan generator 124 may determine one or more deployment dependences between the tasks according to the application topology defined in the blueprint 122. Dependencies between application components and/or nodes defined in the blueprint 122 may be used to determine an order in which the application components should be deployed. A dependency defined as "from" a first application component "to" a second application component represents a requirement that tasks for the first application component cannot be performed until the tasks for the second application component have been completed.

In some embodiments, a dependency between application components may be defined between application components in the same node (e.g., "intra-node" dependency) to represent that, at that node, tasks for one application component are performed after tasks for the other application component. Alternatively, dependencies may be defined between application components in different nodes (e.g., "inter-node" dependencies), such that tasks for an application component at a first node shall be performed after tasks of an application component at a second node have been completed.

In some embodiments, in response to client requests from the application configuration client 110, the application manager 120 may utilize the deployment director 127 to execute the deployment plan 126. Specifically, the deployment director 127 may be configured to execute the deployment plan 126 by communicating with the cloud broker 141 of the cloud 140. As specified by the deployment plan 126, the deployment director 127 may provision and configure a set of VMs 161 in the deployment environment 160. Afterward, the deployment director 127 may provide a series of tasks specific to each of the deployment VMs 161 (a "local deployment plan"). For example, the tasks may be scripts that are executed by VMs 161 to install, configure, and/or start one or more application components. The deployment director 127 may coordinates with VMs 161 to execute the tasks in an order that observes installation dependencies among VMs 161 according to the deployment plan 126. After the deployment director 127 completes all the tasks in the deployment plan 126, the application may be been deemed deployed to the production deployment environment 160 in the cloud 140.

In some embodiments, during the execution of the deployment plan 126 by the deployment director 127, the cloud broker 141 may initiate and manage the provisioning of VMs 161 having specified virtual computing resources (e.g., compute, networking, storage resources). Each of the provisioned VMs 161 may include a corresponding "local deployment agent" configured to execute local deployment plan in coordination with deployment director 127. In other words, the deployment director 127 may separate a deployment plan 126 into multiple local deployment plans for executing on the VMs 161 by their respective deployment agents. The deployment director 127 may maintain a central state of the deployment process and monitor the deployment agents executing the local deployment plans on their respective VMs 161.

In some embodiments, an application's deployment lifecycle may be represented as a series of states and the operations among the states. Specifically, the application deployment lifecycle may be associated with a set of pre-defined or implied ("built-in") application states, such as "Initialized", "Powered-on", etc. The blueprint 122 and the deployment plan 126 may be relied to these built-in application states, as some deployment operations in the blueprint 122 and deployment plan 126 may be relevant before the VMs 161 are initialized, and other deployment operations may be operational after the VMs 161 are powered-on. For example, certain day-1 deployment operations (e.g., resource provisioning, installing of operating systems) may require the VMs 161 to be in an "initialized" state. And other day-2 deployment operations (e.g., configuring web servers, installing application's software components, and other manually or automatically executed management operations) may only be executable after the VMs 161 are initialized and in a "powered-on" state.

In some embodiments, the application lifecycle director 123 may allow the configuration of a customized application lifecycle for the deployment of a specific application. The customized application deployment lifecycle may be in the form of a state machine 125, which may include a set of customized application states for the deployment of an application, as well as a corresponding set of permissible operations that can be performed when the application is in each of the customized application states. In other words, the state machine 125 may include a series of customized application states associated with the blueprint 122, a set of customized deployment operations, and relationships among the customized application states and the customized deployment operations.

In some embodiments, during the configuration of a blueprint 122 for an application, a developer may utilize the application configuration client 110 to communicate with the application lifecycle director 123, and construct a state machine 125 associated with the application and the blueprint 122. Afterward, the developer may utilize the application configuration client 110 to transmit (111) a client request 113 to the application lifecycle director 123, in order to perform a deployment operation on the application. The client request may include the identification of the application, as well as a specific deployment operation to be performed on the application. For clarification, a "deployment operation" may refer to any operation and/or set of tasks that is defined in the blueprint 122, the state machine 125, or is related to the deployment of the application in the cloud 140.

In some embodiments, the application lifecycle director 123 may maintain a set of application states 128 for all the applications that utilized the application lifecycle director 123 to perform any deployment operations. Each of the application states 128 may record and maintain the current (customized or built-in) operation state of a corresponding application in the cloud 140. For example, the current state of a specific application may include "initialized", "configured", "powered-on", "powered-on", or any customized operation states created by the developer. Further, the application lifecycle director 123 may be responsible for ensuring that information in the application states 128 are consistent and up-to-date with the actual states of the applications in the deployment environments of the cloud 140.

In response to the client request, the application lifecycle director 123 may utilize the application identification in the client request to retrieve a current state from the application states 128. Again, the retrieved current state may be indicative of the actual operational state of the application in the cloud 140. In some embodiments, the client request may be the first time to perform any operations on the application, and there is no record in the application states 128 that is associated with this operation. In this case, the application lifecycle director 123 may retrieve an empty current state from the application states 128 for the application.

In some embodiments, based on the state machine 125 and the retrieve current state of the application, the application lifecycle director 123 may determine whether the deployment operation in the client request is pre-defined in the state machine 125 as one of the state operations that are associated with the current state. If the application lifecycle director 123 determines that the deployment operation is not allowed for the application in the specific current state, the application lifecycle director 123 may prevent the deployment operation from being performed at all.

In some embodiments, if the application lifecycle director 123 determines that the deployment operation is allowed for the application in the specific current state, the application lifecycle director 123 may instruct (116) the deployment plan generator 124 to generate a deployment plan 126 for the application, based on the blueprint 122 (and optionally the state machine 125) associated with the application. After the deployment plan 126 is created, the deployment plan generator 124 may instruct (117) the deployment director 127 to execute the deployment plan 126 by communicating with the cloud broker 141.

In some embodiments, the cloud broker 141 may perform the list of tasks defined in the deployment plan 126 under the instructions (131) of the deployment 127. After finished performing the list of tasks, the cloud broker 141 may return (133) a status either directly to the application lifecycle director 123, or indirectly to the application lifecycle director 123 via the deployment director 127 and/or the deployment plan generator 124. Based on the returned status, the application lifecycle director 123 may determine a new state for the application based on the state machine 125 associated with the application, and update the current state of the application in the application states 128 to the new state.

Figure 2:
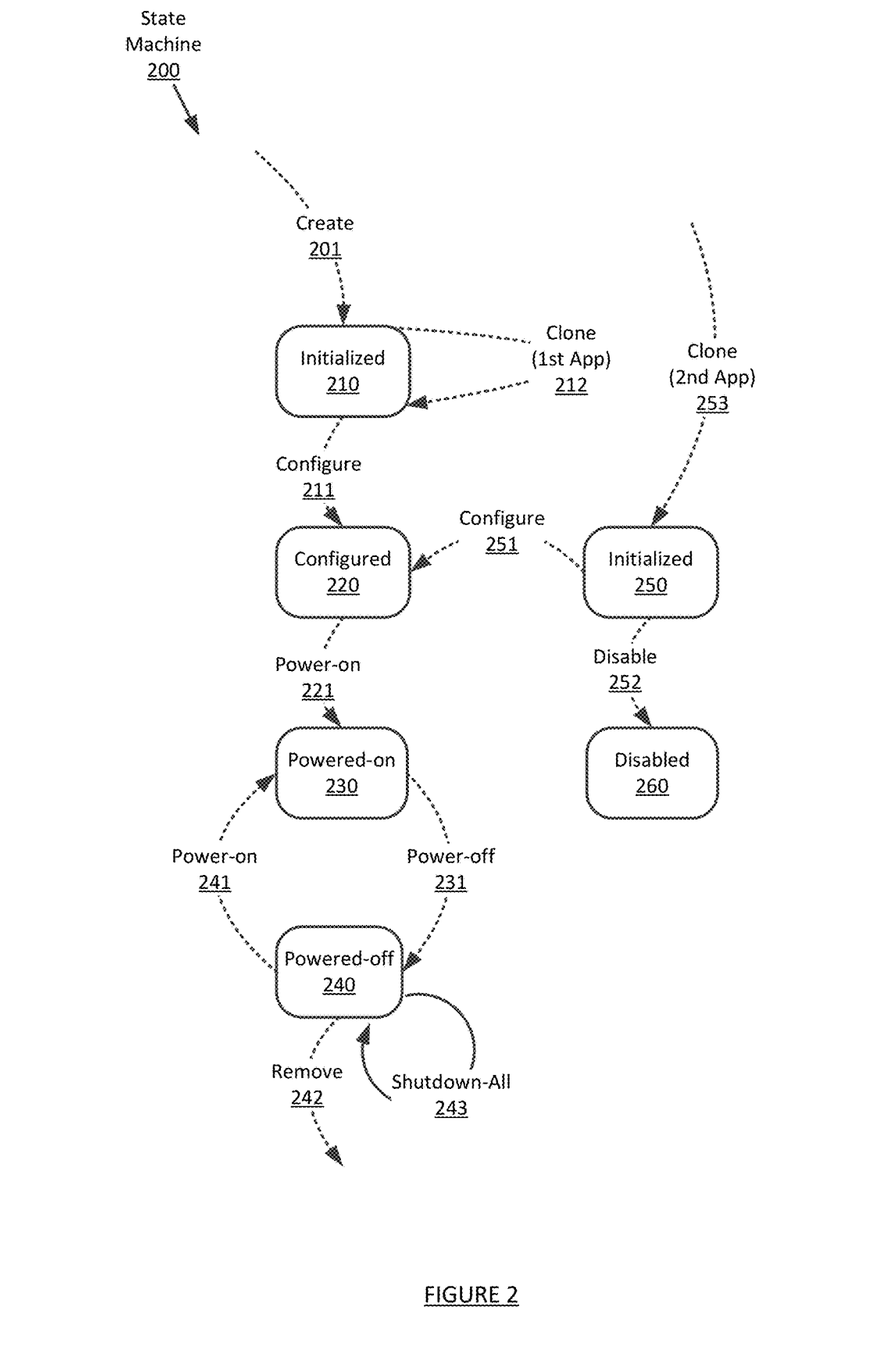
FIG. 2 illustrates a state machine configured to manage application deployment lifecycle in a cloud environment, according to one or more embodiments of the present disclosure.

FIG. 2 illustrates a state machine configured to manage application deployment lifecycle in a cloud environment, according to one or more embodiments of the present disclosure. In FIG. 2, a state machine 200, which may be associated with a specific application to be deployed to a cloud environment, may include a set of application states illustrated by boxes (e.g., 210, 220, etc). The state machine 200 may further include a set of state operations illustrated by arrows (e.g., 201, 211, etc). The "application state" in the state machine 200 may refer to a specific operational state the application might be in during the application deployment lifecycle. And the "state operation" in the state machine 200 may refer to a specific deployment operation that can be executed when the application is in a particular application state, or a specific deployment operation the execution of which may bring the application into a particular application state.

In some embodiments, a blueprint system with a state machine may cover both static and dynamic parts of any application deployment, and may give application developers power to control the full lifecycle of these applications. When a developer utilizes an application manager's topology generator to create a new blueprint, the application manager's application lifecycle director may construct a default state machine associated with the blueprint. The default state machine may include some built-in application states and state operations to support a pre-defined generic application lifecycle. For example, the default state machine may include application states 210, 220 and 230, and state operations 201, 211 and 221. Afterward, the designer may utilize the application lifecycle director to add additional customized operation states to this state machine 200. For example, the developer may add customized application states 240, 250, and 260 to the state machine 200.

In some embodiments, the developer may utilize the application lifecycle director to add additional customized state operations to the state machine 200. For each of the customized state operations, the developer may define a set of application states (pre-states) in which the application may be in before the customized state operation may be performed. In other words, if the application is not in one of the pre-states, the customized state operation is not allowed to be performed. Further, after the performing of the customized state operation on the application, the application's state may be changed to one of the many new state (post-states), depending on the status of the state operations' execution. Thus, each of the post-states may be associated with a specific status of the performing of the customized state operation. Further, the developer may assign to each customized state operation an "operation execution logic," which may be a built-in executor or a customized workflow. Optionally, the developer may configure a "processing application state" to describe the state of the operation during its execution.

In some embodiments, the developer may define one or more pre-states, or one or more post-states for each of the customized state operations. Optionally, a customized state operation may have no pre-states, or no post-states, but cannot have no pre-states and no post-states at the same time. If the built-in application states or the created customized application states are not enough to represent the operation's pre and post states, the developer may create one or more customized application states as shown above. Afterward, the developer may assign the pre-state and post-state relationships for the customized state operation.

In some embodiments, the pre-state and/or the post-state relationships in the state machine 200 may be illustrated by the connections among the boxes and arrows. In FIG. 2, an "initiated" state 210 may be connected with a "configure" state operation 211, which may be connected with a "configured" state 220. In this case, the pre-state relationship may be illustrated by the starting point the arrow is starting from. For example, the "Configure" state operation may be illustrated by an arrow 211 and an arrow 251. In this case, the pre-state relationships with the "Configure" state operation may include state 210 and state 250, meaning that the "Configure" state operation 211 may only be executed when the application's current state is either in the "Initialized" state 210 or in the "Initialized" state 250. Further, the post-state relationship may be illustrated by the ending point the arrow is pointing to. For example, the post-state relationship with the "Configure" state operation may include state 220, meaning that after the performing of the state operation 211, the application's current state may be in the "Configured" state 220.

In some embodiments, as illustrated by the state machine 200, some of the state operations (e.g., state operation 201) may not have a pre-state relationship, while other state operations (e.g., state operation 242) may not have a post-state relationship. Alternatively, a state operation may have multiple pre-state relationships and/or multiple post-state relationships. For example, the state operation "Power-on" (illustrated by arrows 221 and 241) may have two pre-state relationships with the "Configured" state 220 and "Powered-off" state 240. In this case, the state operation's multiple pre-state relationships may indicate that only if the application is in one of pre-states that are related with the state operation, may the operation be performed. In comparison, the state operation "remove" 242 may not have any post-state relationship. In this case, after the completion of this state operation 242, the current state of the application may be removed from the application states maintained by the application lifecycle director.

In some embodiments, the state machine 200 as illustrated in FIG. 2 may be implemented using data structures shown in the following Example 1. In the Example 1, the pre-state relationships may be implemented using a pre-state list associated with the state operation. Likewise, the post-state relationships may be implemented using a post-state list associated with the state operation. As a state operation may have multiple post-state relationships depending on the status of the state operation's execution. Each post-state of the application may be associated with a specific status of the state operation's execution. As illustrated in the Example 1, when the status of the "Power-On" state operation's execution indicates success, the application may be in a "Powered-On" post-state. If the "Power-On" state operation's execution failed, the application may be in a "Powered-Off" post-state.

State Operations:

Create (201)
    1st Application: create_application from outputs
        Pre-State List: [ ]
        Post-State List: [Configured <if success>]
Configure (211, 251)
    1st Application: application from inputs
        Pre-State List: [Initialized]
        Post-State List: [Configured <if success>]
Power-On (221, 241)
    1st Application: application from inputs
        Pre-State List: [Configured, Powered-off]
        Post-State List: [Powered-On <if success>, Powered-off <if failed>]

-continued

State Operations:

Power-Off (231)
    1st Application: application from inputs
        Pre-State List: [Powered-on]
        Post-State List: [Powered-Off <if success>, Powered-On <if failed>]
Remove (242)
    1st Application: application from inputs
        Pre-State List: [Powered-Off]
        Post-State List: [Powered-Off <if failed>]
Disable (252)
    1st Application: application from inputs
        Pre-State List: [Initialized]
        Post-State List: [Disabled <if success>]
Clone (212)
    1st Application: source_application from inputs
        Pre-State List: [Initialized, Configured, Powered-On]
        Post-State List: [Initialized, Configured, Powered-On]
    2nd Application: destination application from outputs
        Pre-State List: [ ]
        Post-State List: [Initialized <if success>]
Shutdown-All (243)
    Application Set: <bind to inputs.application_name_set>
        Pre-State List: [Powered-Off]
        Post-State List: [Powered-Off <if failed>]

Example 1

In some embodiments, in response to a client request to perform a deployment operation on an application in the cloud environment, the application lifecycle director may identify the state machine 200 that is associated with the application, and retrieve a current state of the application (e.g., from its managed application states 128). Afterward, the application lifecycle director may determine whether the deployment operation is defined in the state machine 200 as one or more state operations. If the application lifecycle director cannot identify any state operation in the state machine 200 that is identical to the deployment operation, the application lifecycle director may return an error message in response to the client request, indicating that the deployment operation is not allowed to be performed on the application.

In some embodiments, if the application lifecycle director identifies a state operation in the state machine 200 that is identical to the deployment operation, the application lifecycle director may evaluate the application's current state against the state operations' pre-state list. If the application lifecycle director determines that the application's current state is NOT on this pre-state list, the application lifecycle director may return an error message in response to the client request, indicating that the deployment operation is not allowed to be performed on the application. If the application lifecycle director determines that the application's current state is on this pre-state list, the application lifecycle director may allow the deployment operation's execution by transmitting an instruction to the deployment plan generator or the deployment director to perform the deployment operation on the application.

In some embodiments, after the performing of the deployment operation on the application, the application lifecycle director may utilize a post-state evaluator to determine the status of the performing of the deployment operation. The post-state evaluator may determine the status by evaluating the input properties, output properties, and other processing properties associated with the performing of the deployment operation. In some embodiments, the state evaluator may include a boolean expression to generate a "success" or "failed" status for the deployment operation's execution. Based on this status, the application lifecycle director may select one of the post-lists that is associated with this "success" or "failed" status as the new state of the application, and store this new state as the current state of the application.

In some embodiments, based on the status of the performing of the deployment operation, the application lifecycle director may select multiple post-lists for the application. For example, the state machine may define that after a success in performing a "Configure" deployment operation, the application may be in a "Configured" state or a "Stand-by" state. In this case, the state machine may add a unique priority value for each of the post-states associated with a state operation, and application lifecycle director may select the post-state having the highest priority value as the new current state of the application.

In some embodiments, the status of the performing of the deployment operation may be a predetermined status code (e.g., an integer) associated with a specific post-state, and the application lifecycle director may select a post-state by evaluating the returned status code. For example, a "Configured" post-state may be associated with a status code "1", and a "Stand-by" post-state may be associated with a status code "2". If the performing of the deployment operation returns a status code "2", the application lifecycle director may automatically select the "Stand-by" post-state as the new current state of the application. Such an approach may give the actual decision right to the operation execution logic.

In some embodiments, a customized deployment operation may be a binary-application or multi-application operation that involves more than one application. For example, a "clone" operation may include the creating of a new application based on an existing application. As shown in the above Example 1, the state machine 200 may include configurations for multiple applications (e.g., source (1st) application and destination (2nd) application). Further, each application configuration may be associated with a corresponding pre-state list and a corresponding post-state list. Thus, when the application lifecycle director receives a client request for performing a clone deployment operation, the application lifecycle director may evaluate the current state of the source application and destination application. If the source application is not in one of the pre-states (e.g., not in "Initialized", "Configured", or "Powered-On" state), the application lifecycle director may not allow the performing of such clone deployment operations. Based on the status of the performing of the clone deployment operations, the application lifecycle director may utilize the source application's post-state list to set the source application's new current state, and utilize the destination application's post-state list to set the destination application's new current state.

In some embodiments, a single operation may be applied to multiple or all the applications. In this case, the state machine 200 may include a batch-operation, such as the shutdown-all operation 243, to allow simultaneous managements of these multiple applications. As shown by the Example 1 above, the state operation "Shutdown-All" may be applied to "Application Set", rather than to one or two individual applications. During execution, the application lifecycle director may identify all the applications that are suitable based on the selection/binding logics defined in the state machine 200, and then apply the state operation on these identified applications. Afterward, the status of the batch-operation may be individually tailored to the applications, in order to set these applications' new current states. In other words, if the batch-operation succeeded in some identified applications and failed in other identified applications, the new current state of the succeeded applications may be set with a "Success" post-state, and the new current state of the failed applications may be set with a "Failed" post-state.

In some embodiments, FIG. 2's state machine 200 may have all the identical states consolidated into a single state. For example, both state 210 and state 250 represent an "Initialized" state. In this case, these two states may be combined into a single state (e.g., state 210), and any arrows pointing to the state 250 (e.g., arrow 253) or pointing from the state 250 (e.g., arrows 251 and 252) may be moved to the state 210 accordingly. Thus, the application lifecycle director may be configured to create customized application states and their associations to the corresponding state operations, thereby giving application developer great flexibilities in controlling the application deployment lifecycle, and in defining different application deployment lifecycles for different applications.

Figure 3:
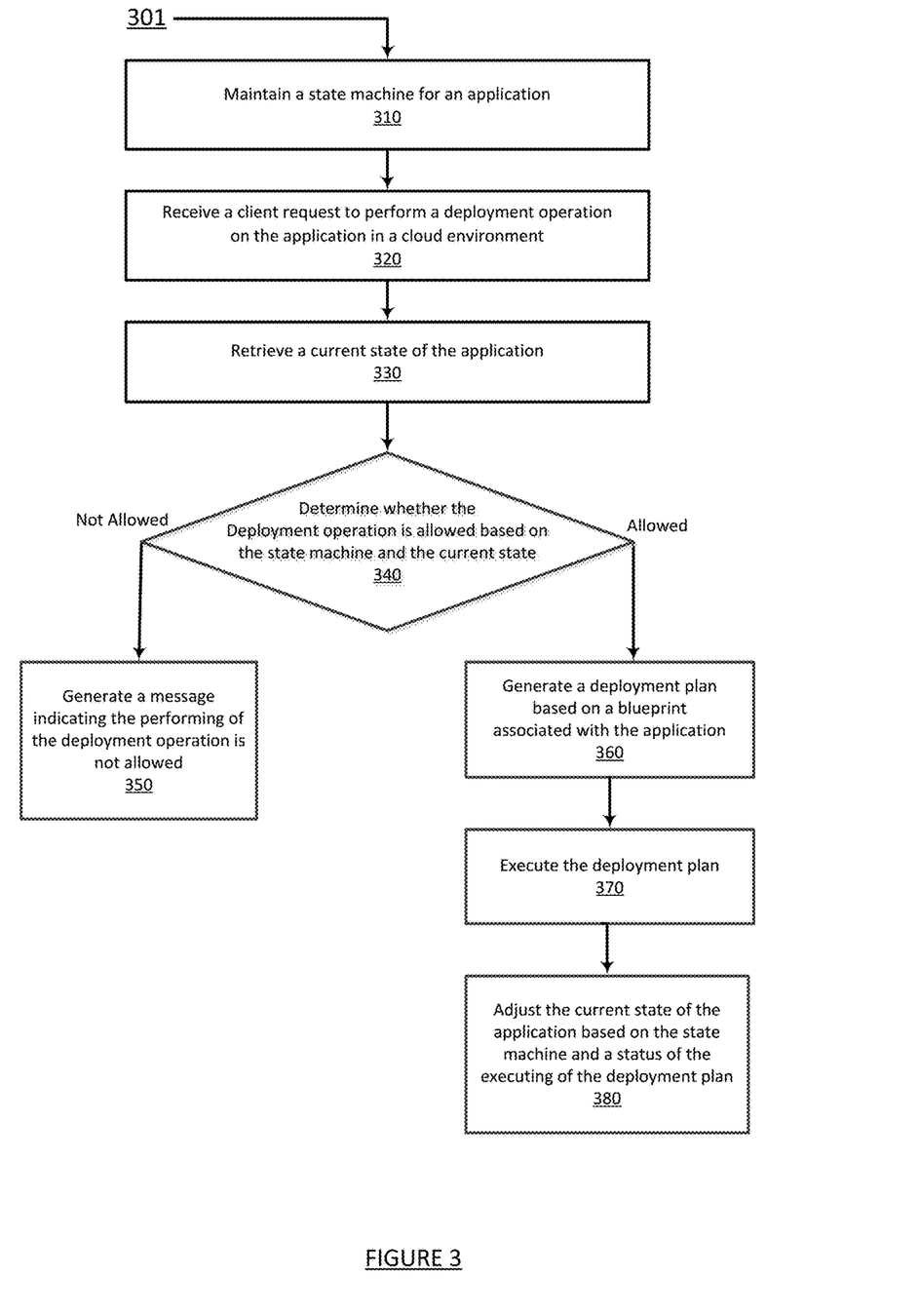
FIG. 3 shows a flow diagram illustrating a process to manage application deployment in a cloud environment, according to one or more embodiments of the present disclosure.

FIG. 3 shows a flow diagram illustrating a process to manage application deployment in a cloud environment, according to one or more embodiments of the present disclosure. The processes 301 may set forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 3 may be practiced in various implementations.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Moreover, one or more of the outlined steps and operations may be performed in parallel.

At block 310, an application manager may be configured to manage a cloud environment. The application manager may further be configured to maintain a state machine for an application. In some embodiments, the state machine may include a plurality of application states, a plurality of state operations, and relationships among the plurality of application states and the plurality of state operations. Specifically, the relationships may be one or more pre-state relationships or one or more post-state relationships. Further, each of the plurality of state operations in the state machine may be associated with a corresponding pre-state or a corresponding post-state, each of which being selected from the plurality of application states.

At block 320, the application manager may receive a client request to perform a deployment operation on an application in the cloud environment. At block 330, in response to the client request, the application manager may retrieve a current state of the application in the cloud environment.

At block 340, the application manager may determine whether the deployment operation is allowed based on the state machine and the current state. Specifically, the application manager may select a state operation from the plurality of state operations in the state machine using the deployment operation. In some embodiments, in response to a determination that the current state of the application is not a pre-state associated with the state operation, the application manager may determine that the deployment operation is not allowed, and the process 301 may proceed to block 350. Alternatively, in response to a determination that the current state of the application is a pre-state associated with the state operation, the application manager may determine that the deployment operation is allowed, and the process 301 may proceed to block 360.

At block 350, in response to the determination that the deployment operation is not allowed, the application manager may generate a message as a response to the client request, indicating the performing of the deployment operation on the application in the cloud environment is not allowed according to the state machine.

At block 360, the application manager may generate a deployment plan based on a blueprint associated with the application. Specifically, the blueprint may define how to perform the deployment operation in the cloud environment, and may include a topology of virtual computing resources in the cloud environment, a plurality of application components associated with the application and assigned to the virtual computing resources, and dependencies among the application components. Further, the generated deployment plan may include a plurality of tasks generated based on the blueprint.

At block 370, the application manager may execute the deployment plan to perform the deployment operation in the cloud environment. In some embodiments, the application manager may be configured to communicate with a cloud broker associated with the cloud environment to execute the plurality of tasks in the cloud environment.

At block 380, after the performing of the deployment operation, the application manager may adjust the current state of the application based on the state machine and a status of the executing of the deployment plan. Specifically, the application manager may select a state operation from the plurality of state operations using the deployment operation. In response to a determination that the status of the performing of the deployment operation is successful, the application manager may assign the current state of the application using a post-state associated with the state operation and a success status.

In some embodiments, in response to a determination that the state of the performing of the deployment operation is not successful, the application manager may assign the current state of the application using a post-state associated with the state operation and a failed status. Further, in response to a determination the state operation is not associated with a post-state, the application manager may remove the current state of the application.

Thus, systems and methods for managing application deployment in a cloud environment have been disclosed. The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the disclosure may be useful machine operations.

In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term non-transitory computer readable storage medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

I claim:

1. A method for managing application deployment in a cloud environment, the method comprising:
   receiving, by an application manager configured to manage the cloud environment, a client request to perform a deployment operation on an application in the cloud environment;
   retrieving, by the application manager, a current state of the application in the cloud environment;
   determining, by the application manager, whether the deployment operation is allowed based on a state machine and the current state of the application, wherein the state machine includes a plurality of application states, a plurality of state operations, and relationships among the plurality of application states and the plurality of state operations; and
   in response to a determination that the current state of the application is a pre-state associated with a state operation from the plurality of state operations, and the deployment operation is allowed,
      generating, by the application manager, a deployment plan based on a blueprint associated with the application, wherein the blueprint defines how to perform the deployment operation in the cloud environment,
      executing, by the application manager, the deployment plan to perform the deployment operation in the cloud environment, and
      adjusting the current state of the application based on the state machine and a status of the performing of the deployment operation.

2. The method as recited in the claim 1, wherein the blueprint includes a topology of virtual computing resources in the cloud environment, a plurality of application components associated with the application and assigned to the virtual computing resources, and dependencies among the application components.

3. The method as recited in the claim 1, wherein the deployment plan includes a plurality of tasks generated based on the blueprint, and the application manager is configured to communicate with a cloud broker associated with the cloud environment to execute the plurality of tasks in the cloud environment.

4. The method as recited in the claim 1, wherein the determining whether the deployment operation is allowed comprising:
   selecting the state operation from the plurality of state operations using the deployment operation.

5. The method as recited in the claim 1, further comprising:
   in response to a determination that the deployment operation is not allowed, generating a message in response to the client request indicating the performing of the deployment operation on the application in the cloud environment is not allowed according to the state machine.

6. The method as recited in the claim 1, wherein each of the plurality of state operations in the state machine is associated with a corresponding pre-state or a corresponding post-state, and each of the corresponding pre-state or the corresponding post-state is selected from the plurality of application states.

7. The method as recited in the claim 1, wherein the adjusting of the current state comprising:
   selecting the state operation from the plurality of state operations using the deployment operation; and
   in response to a determination that the status of the performing of the deployment operation is successful, assigning the current state of the application using a post-state associated with the state operation and a success status.

8. The method as recited in the claim 1, wherein the adjusting of the current state further comprising:
   in response to a determination that the state of the performing of the deployment operation is not successful, assigning the current state of the application using a post-state associated with the state operation and a failed status.

9. The method as recited in the claim 1, wherein the adjusting of the current state further comprising:
   in response to a determination that the state operation is not associated with a post-state, removing the current state of the application.

10. A non-transitory computer-readable storage medium, containing a set of instructions which, in response to execution by a processor, cause the processor to perform a method for managing application deployment in a cloud environment, the method comprising:
   maintaining, by an application manager configured to manage the cloud environment, a state machine, wherein the state machine includes a plurality of application states, a plurality of state operations, and relationships among the plurality of application states and the plurality of state operations;
   in response to a client request for performing a deployment operation on an application in the cloud environment, retrieving, by the application manager, a current state of the application in the cloud environment; and
   in response to a determination that the deployment operation is allowed based on the state machine and the current state of the application being a pre-state associated with a state operation from the plurality of state operations,
      generating, by the application manager, a deployment plan based on a blueprint associated with the application, wherein the blueprint defines how to perform the deployment operation in the cloud environment, and
      adjusting the current state of the application based on the state machine and a status of performing the deployment operation.

11. The non-transitory computer-readable storage medium of the claim 10, wherein the generating of the deployment plan comprising:

generating a plurality of tasks based on the blueprint, wherein a cloud broker associated with the cloud environment is configured to execute the plurality of tasks in the cloud environment.

12. The non-transitory computer-readable storage medium of the claim 10, wherein the determination that the deployment operation is allowed comprising:
selecting the state operation from the plurality of state operations using the deployment operation.

13. The non-transitory computer-readable storage medium of the claim 10, wherein the method further comprising:
transmitting, by the application manager, the deployment plan to a cloud broker associated with the cloud environment, wherein the cloud broker is configured to perform the deployment operation on the application in the cloud environment based on the deployment plan.

14. A system for managing application deployment in a cloud environment, the system comprising: a memory and a processor;
an application lifecycle director configured to maintain a state machine, wherein the state machine includes a plurality of application states, a plurality of state operations, and relationships among the plurality of application states and the plurality of state operations; and
a deployment plan generator
wherein in response to a client request for performing a deployment operation on an application in the cloud environment,
the application lifecycle director is further configured to retrieve a current state of the application in the cloud environment, and determine whether the deployment operation is allowed based on the state machine and the current state of the application,
in response to the determination that the current state of the application is a pre-state associated with a state operation from the plurality of state operations, and the deployment operation is allowed, the deployment plan generator is configured to generate a deployment plan for the application based on a blueprint associated with the application, and
the application lifecycle director is further configured to maintain the current state of the application, and adjust the current state of the application based on the state machine and a status of performing the deployment operation.

15. The system of claim 14, further comprising:
a topology generator configured to maintain the blueprint associated with the application, wherein the blueprint defines how to perform the deployment operation in the cloud environment.

16. The system of claim 14, further comprising:
a deployment director coupled with the deployment plan generator, wherein the deployment director is configured to interact with a cloud broker associated with the cloud environment, and the cloud broker is configured to perform the deployment operation in the cloud environment based on the deployment plan.

* * * * *